United States Patent Office 2,853,466
Patented Sept. 23, 1958

2,853,466

BIS(p - SALICYLOYLPHENYL)PHENYLENE DICARBAMATE AND CHLOROETHYLENE POLYMER CONTAINING SAME

Carl B. Havens, Hope, Mich., assignor to The Dow Chemical Company, Midland, Mich., a corporation of Delaware No Drawing. Application August 2, 1956
Serial No. 601,637

6 Claims. (Cl. 260—45.85)

This invention relates to new organic compounds and to polymeric compositions containing the same. More particularly it relates to new organic compounds finding utility as light stabilizers for haloethylene polymers.

Haloethylene polymers, such as those containing at least 50 percent vinylidene chloride, are known to be highly sensitive to the effects of elevated temperatures and of light and under prolonged exposure to heat and light may become so degraded and discolored as to be commercially useless. It has been common practice to blend certain compounds with the polymer to stabilize it against the degradative effects of heat and light. Several of such compounds, however, are highly colored materials which impart an objectionable initial color to the stabilized composition which prevents the production of a commercially saleable white composition. Still other disadvantages of many of the previous compounds are a high odor level and volatility. Any odor in the stabiliber will be transferred to the stabilized composition. When volatile stabilizers are employed the stabilizers volatilize out of the composition leaving the composition in time unprotected against the degradative effects of light, particularly ultra-violet light. In addition all of the compounds vary in their ability to absorb ultra-violet light and it is impossible to predict the effectiveness of any particular compound with any degree of certainty, and even then some of the initially useful compounds when in the compositions lose some of their effectiveness for absorbing ultra-violet light over a prolonged period of time.

In view of the above problems it would be desirable and it is the principal object of this invention to provide a new group of organic compounds having the stated utility.

It is a further object to provide a group of such compounds which have little or no color and have a low odor level.

Another object is to provide a group of such compounds which have low volatility.

The above and related objects are accomplished by means of a group of dicarbamates resulting from the reaction of certain dihydroxy benzophenones and diisocyanates. The objects are further realized with compositions containing such dicarbamates together with haloethylene polymers.

For ease of preparing the compounds the preferred dihydroxy benzophenones which are useful herein are those having at least one hydroxyl in an ortho position to the benzoyl group and at least one hydroxyl in a position other than ortho to the benzoyl group. Both of the essential hydroxyl substituents may be on the same phenyl group or each may be on a different phenyl group. Monohydroxy benzophenones and those dihydroxy benzophenones having both hydroxys in the same position, whether it be ortho, meta, or para, to the carbonyl group result in reaction products having no light stabilizing effectiveness for haloethylene polymers.

The dicarbamates of this invention are easily prepared by a simple reaction between the proper benzophenone and diisocyanate in an organic solvent. As illustrative of the preparation, 0.02 mole of 2,4'-dihydroxybenzophenone and 0.01 mole of m-toluene diisocyanate were dissolved in 45 cc. of chlorobenzene and 5 cc. of o-dichlorobenzene and refluxed for 6 hours. The product having the structural formula

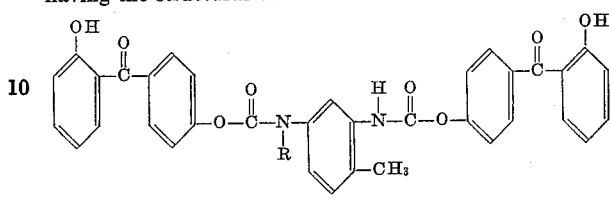

was isolated by evaporation of the solvents. After recrystallization the bis(p-salicyloylphenyl)-2-methyl-m-phenylenedicarbamate was isolated as a light tan solid melting at 100° C. The crude unrecrystallized product was also found to be an effective stabilizer for haloethylene polymers.

The dicarbamates of this invention are effective stabilizers for haloethylene polymers, particularly those polymers containing at least 50 percent vinylidene chloride. Such polymers are known to be especially sensitive to the effects of light. The compounds are effective when employed in amounts of from 1 to 10 percent, preferably 1 to 3 percent of the weight of the polymer used in the composition. Compositions containing less than 1 percent exhibit little more stability than unstabilized compositions. No beneficial result accrues from the use of more than 10 percent, and the cost and physical properties, such as strength, of the compositions suffer.

The dicarbamates may be used in polymer compositions containing the common additives such as pigments, fillers, heat stabilizers, and plasticizers. They likewise may be used in combination with other known light stabilizers.

By way of example, two sample compositions were prepared containing 92.5 parts by weight of a copolymer composed of 85 percent vinylidene chloride and 15 percent vinyl chloride, 0.5 part of sodium tripolyphosphate as a heat stabilizer, and 7 parts of an ester of pentaerythritol sold commercially as J–15 by the Hercules Powder Co. as a plasticizer. One of the samples was left unstabilized for comparative purposes while the other contained 3 percent by weight of bis(p-salicyloylphenyl)-3-methyl-p-phenylenedicarbamate. Each of the compositions was exposed to ultra-vilot sunlamps for 4 days and then examined visually for discoloration. The unstabilized sample had turned dark brown and the stabilized sample light tan.

I claim:

1. As a new organic compound a bis(p-salicyloylphenyl) phenylene dicarbamate.

2. As a new organic compound bis(p-salicyloylphenyl) - 3-methyl-p-phenylenedicarbamate characterized by being a light tan solid melting at 100° C.

3. A thermoplastic composition comprising a thermoplastic chloroethylene polymer and from 1 to 10 percent of the weight of said polymer of a bis(p-salicyloylphenyl) phenylene dicarbamate.

4. The composition claimed in claim 3, wherein said dicarbamate is bis(p-salicyloylphenyl)-2-methyl-m-phenylene-dicarbamate.

5. The composition claimed in claim 3, wherein said chloroethylene polymer is a copolymer composed of at least 50 percent by weight of vinylidene chloride.

6. The composition claimed in claim 3, wherein said chloroethylene polymer is a copolymer of vinylidene chloride and vinyl chloride.

No references cited.